US010531635B2

(12) United States Patent
Agayev et al.

(10) Patent No.: US 10,531,635 B2
(45) Date of Patent: Jan. 14, 2020

(54) METHOD AND DEVICE FOR CLEANING CUBICLES

(71) Applicant: LELY PATENT N.V., Maassluis (NL)

(72) Inventors: Samir Agayev, Maassluis (NL); Çavlan Bas, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 1129 days.

(21) Appl. No.: 14/410,478

(22) PCT Filed: Jul. 19, 2013

(86) PCT No.: PCT/NL2013/050545
§ 371 (c)(1),
(2) Date: Dec. 22, 2014

(87) PCT Pub. No.: WO2014/021712
PCT Pub. Date: Feb. 6, 2014

(65) Prior Publication Data
US 2015/0223427 A1 Aug. 13, 2015

(30) Foreign Application Priority Data

Aug. 2, 2012 (NL) .................................. 2009264
Dec. 14, 2012 (NL) .................................. 2009985

(51) Int. Cl.
A01K 1/01 (2006.01)
(52) U.S. Cl.
CPC ...................................... A01K 1/01 (2013.01)
(58) Field of Classification Search
None
See application file for complete search history.

(56) References Cited

U.S. PATENT DOCUMENTS 5,951,782 A 9/1999 Truitt
2002/0133899 A1 9/2002 Van Den Berg
(Continued)

FOREIGN PATENT DOCUMENTS

CA 2679763 A1 3/2010
WO WO 00/70935 A1 11/2000
(Continued)

OTHER PUBLICATIONS

Canadian Office Action for Canadian Application No. 2,878,417, dated Nov. 27, 2018.

Primary Examiner — Katelyn B Whatley
(74) Attorney, Agent, or Firm — Birch, Stewart, Kolasch & Birch, LLP

(57) ABSTRACT

The invention relates to a method of cleaning at least a part of a cubicle from a row of individual cubicles in a stable, each cubicle having lateral partitions extending in the longitudinal direction on each side of the cubicle, the method comprising the steps of providing an animal presence sensor for detecting the presence of an animal in a cubicle, and providing an autonomous unmanned vehicle, the vehicle comprising a control system for controlling the operation of the vehicle and cubicle floor cleaning means, and the method further comprising the steps of detecting by an animal presence sensor a first of the cubicles free of an animal, detecting whether an animal is present in a second of the cubicles neighboring next to the first cubicle, and controlling the autonomous vehicle to clean the first cubicle in a first cleaning mode that is dependent on the presence of an animal in said second neighboring cubicle. The invention also relates to an autonomous unmanned vehicle for cleaning cubicles.

11 Claims, 2 Drawing Sheets

(56) References Cited

U.S. PATENT DOCUMENTS

| | | | | |
|---|---|---|---|---|
| 2009/0288681 | A1* | 11/2009 | Pastoor | A01K 1/01 134/6 |
| 2010/0076641 | A1* | 3/2010 | Van Den Berg | A01K 1/01 701/26 |
| 2012/0048207 | A1* | 3/2012 | Hofman | A01J 7/04 119/651 |
| 2014/0318581 | A1* | 10/2014 | Axelsson | A01J 7/02 134/18 |

FOREIGN PATENT DOCUMENTS

| WO | WO 2007/114684 A1 | 10/2007 |
|---|---|---|
| WO | WO 2008/118006 A1 | 10/2008 |

* cited by examiner

METHOD AND DEVICE FOR CLEANING CUBICLES

FIELD OF THE INVENTION

The invention relates to a method of cleaning cubicles, in particular in a free stable or shed for dairy cattle. The invention also relates to a device, in particular to an autonomous unmanned vehicle, for cleaning cubicles in a free stable for cattle.

BACKGROUND TO THE INVENTION

In the cattle farming sector, and dairy farming in particular, the animals are accommodated in stables or barns at least for a part of the year. In a tie-stable each animal is held in a fixed location and is fed and optionally milked there. More recently there is a trend towards cubicle stable or free stables. The animals can walk around freely therein and each animal can go and stand there or lie down in a cubicle and rest and/or chew the cud. Feeding and milking may take place elsewhere at a feeding fence or feeding station and a milking machine. A cubicle stable is provided with one or more rows of neighboring cubicles, and each cubicle being defined by a rear short end, an open front short side forming the entrance and exit for the animal to the cubicle, with lateral partitions extending at the long sides of the cubicle, and with a rear partition limiting the animal's movement at said rear short side. The positioning of an animal in the cubicle is such that the animal is orientated substantially parallel to the longitudinal direction of the cubicle. The floor space of a cubicle is commonly provided with a kind of mattress or covered with a dry material like straw and/or sawdust. A cubicle for dairy cattle is commonly in a range of about 1.0 to about 1.4 meters wide, more typically about 1.1 to about 1.3 meters, and up to about 2.4 meters long. The partitions or dividers are commonly formed from a metal tube construction, for instance tube parts curved in a U-shape, R-shape, P-shape or other form, which are attached to posts anchored in the floor and/or to the rear end. Furthermore, in a cubicle stable in front of each row of cubicles there is the barn floor, which optionally could be provided with a slatted floor. In most stable there is in practice a small offset between the cubicle floor and the barn floor.

It is important that both the barn floor and the cubicle floors are frequently cleaned from dirt, in particular from manure. Several methods and corresponding devices are known in the art for cleaning barn floors from manure and other dirt in a stable, such as a manure slide. Some of these methods and corresponding devices allow for cleaning of the front part of the floor of a row of cubicles while simultaneously cleaning the barn floor. Cleaning of a row of cubicle floors is often done by means of rotatable brushes. A disadvantage of most of these known devices is that they require the involvement of an operator during the cleaning action. A further disadvantage is that the cubicle floors are cleaned substantially parallel to the front sides of the cubicle and for a non-interrupted cleaning operation this requires that in a row of cubicles none of the cubicles are occupied by an animal.

In the art also methods and corresponding devices are known for cleaning individual cubicles. For example such a device is known from US patent document US-2002/0133899-A1 (Lely) as published on 26 Sep. 2002. The known unmanned device cleans a cubicle floor in its longitudinal direction by using a manure displacement device and can be provided further with a manure slide to clean at least a part of the slatted floor or barn floor. Detecting means are provided which are capable of observing the dirt present on the cubicle floor.

However in practice, an animal, such as a cow, can be hurt by the cleaning devices, while contrarily some non-occupied cubicles are not cleaned.

DESCRIPTION OF THE INVENTION

It is an object of the present invention to provide a method of cleaning a cubicle in a stable while avoiding physical contact between an animal in a neighboring cubicle and any activated cleaning means cleaning the subject cubicle.

It is another object of the invention to provide a device for operating the method according to this invention.

It is yet another object of the invention to provide an autonomous unmanned vehicle for operating the method according to this invention.

These and other objects and further advantages are met or exceeded by the present invention providing a method of cleaning at least a part of a floor of a cubicle from a row of individual cubicles in a stable, preferably a stable for dairy cattle, each cubicle having a floor space with a rear end for limiting an animal's movement in the direction of the rear end, an open front end for access of an animal to the cubicle, and lateral partitions extending in the longitudinal direction on each side of the cubicle, the method comprising the steps of providing an animal presence sensor arranged to detect the presence of an animal in a cubicle, and providing an autonomous unmanned vehicle, the vehicle comprising a control system for controlling the operation of the vehicle and cubicle floor cleaning means for cleaning a part of the cubicle floor, and which control system is operatively coupled with the animal detection sensor. The method further comprising the steps of detecting by an animal presence sensor a first of the cubicles free of an animal, detecting by an animal presence sensor whether an animal is present in a second of the cubicles neighboring next to the first cubicle free of an animal, generating a signal by said sensor for the control system of the vehicle regarding the position of the cubicle, and controlling the autonomous unmanned vehicle to clean at least a part of the floor of the first cubicle in a first cleaning mode that is dependent on the presence of an animal in said second neighboring cubicle. Preferably under control of the control system activating the cubicle floor cleaning means and cleaning at least a part of the floor of the first cubicle by means of the cubicle floor cleaning means of the vehicle, and wherein the step of cleaning the floor of said first cubicle comprises keeping at least a predetermined safety distance ("d") to said second cubicle and wherein the predetermined safety distance "d" depends on whether an animal is detected to be present in said second neighboring cubicle.

The present invention is at least in part based on the insight that an animal, such as a cow, lying in its cubicle may extend a leg part or a part of its back, loin or belly underneath a lateral partition and into a neighboring cubicle. In automated cleaning operations of a single cubicle the presence of such a body part like a leg part is not necessarily always detected or possibly in error identified as dirt lying on the cubicle floor and consequently approached by an activated manure displacement device, which is a highly undesirable effect. In accordance with the invention a cubicle floor is cleaned using the activated cleaning means of an autonomous unmanned vehicle travelling through a stable. In the cleaning operation it is taken into account whether or not the neighboring next cubicle is occupied or not by the animal presence sensor or sensors. If it is detected that the neighboring next cubicle is unoccupied, then there is no need to apply a predetermined safety distance with respect to the lateral partition. It can be selected to be very small, e.g. about 15% or less of the width of a cubicle, or it can be selected to be zero. However, if it is detected that the neighboring next cubicle is occupied then the cubicle floor can be cleaned while staying away from the lateral partition at a predetermined safety distance ("d"). This achieves the effect that the chance of undesired physical contact between activated cubicle floor cleaning means and an animal are minimized, while the cubicle floor in its width direction is being cleaned over a large area.

In an embodiment of the invention the predetermined safety distance d is at least 15% of the width of an individual cubicle, and preferably at least 20%, and more preferably at least 30%. The predetermined safety distance d is at most 50% of the width of an individual cubicle, and preferably at most about 45%, creating a practical operating range for the cleaning means while ensuring enhanced stable hygiene and animal safety. It is preferred that an predetermined safety distance of at least about 30 cm is being applied from the lateral partition with the second neighboring cubicle.

In an embodiment the cubicle(s) is/are cleaned over a distance from the cubicle front end up to about 20% of the length of an individual cubicle, preferably up to about 25%, and more preferably up to about 35%. In practice the manure is mostly accumulated at the very beginning of a cubicle and the cleaning operation can be limited to that area cubicles accordingly. However, the cleaning means can be activated also to clean a larger area into a cubicle, and if necessary in the longitudinal direction up to the rear short end of the cubicle. This will allow also the removal of any dirty dry material lying on the cubicle floor, which may be replenished thereafter with fresh dry material.

In an embodiment of the invention the method further comprising the steps of detecting by an animal presence sensor at least two neighboring first and second cubicles free from animals and having a common lateral partition therebetween and each having a second lateral partition opposite to the common lateral partition, and further comprising the steps of generating a signal by said sensor for the control system of the vehicle regarding the position of said first and second cubicles, and under control of the control system activating the cubicle floor cleaning means, and cleaning in a second cleaning mode at least a part of both the first and second cubicle floor in an area from the centerline of the common lateral partition and extending at most until a predetermined safety distance ("d") from each of the lateral second partitions, and wherein distance d is selected as if an animal is present in the neighboring cubicles having the second lateral partition in common with the respective first and second cubicle.

This achieves the effect that in each cleaning operation the cubicle floor of two neighboring unoccupied cubicles is cleaned over 50% or more of the width of each of the individual unoccupied cubicles and this cleaning operation is performed at a sufficiently safe distance from the second lateral partitions. This achieves the effect that the chance of undesired physical contact between activated cubicle floor cleaning means and an animal in the occupied cubicle, is minimized, while the individual cubicle floor of each of the unoccupied cubicles in its width direction is cleaned for 50% or more. It is ensured also that the area near and underneath a common lateral partition is frequently cleaned thereby enhancing stable hygiene. The non-cleaned part of a cubicle floor can be cleaned at a next occasion when the subject cubicle and its opposite counter-part are unoccupied. As a result a cubicle floor of an individual cubicle is cleaned in full in two separate in time spaced apart cleaning operations using the autonomous unmanned vehicle equipment in accordance with this invention. Since such an autonomous unmanned vehicle can travel continuously through a stable and animals are frequently leaving their cubicles for milking and/or feeding at another location in the stable, over a longer period of time each individual cubicle floor can be cleaned in full. The method of this invention allows on a statistical basis that each individual cubicle floor of all cubicles in a stable are being cleaned over their full width direction at a frequency of at least two or three times a day creating a sufficiently clean environment with good safety for the animals.

In an embodiment the cubicle floor cleaning means are centered with respect to the common lateral partition. In practice this can be done in several ways, such as the use of reference points near or at a lateral partition or based on the vision from a preinstalled camera above the row of cubicles or it can be based on a pre-set route of the autonomous unmanned vehicle.

In order to enhance the cleaning operation, it is preferred that any lateral partition holds as few obstacles as possible for performing the cleaning operation in accordance with the invention. In case the lateral partition comprises a post supporting onto the cubicle floor, it is preferred that any such post is located as much as possible near the rear short end of the cubicle. More preferably the lateral partition is devoid of any support posts attached to or supporting onto the cubicle floor. This can be achieved by a one-sided suspension, anchoring or hinging of the lateral partition to or near the rear end of the cubicles, as is well known in the art. This allows that on a frequent basis the entire cubicle floor underneath the lateral partition can be cleaned using the method and corresponding autonomous unmanned vehicle according to this invention.

The animal presence sensor for detecting the presence of an animal, such as a cow, in a cubicle, is preferably selected from the group comprising laser means, infrared means, radiographical means, induction means, and a camera. As camera e.g. a 2D or 3D camera, and a thermal camera can be applied. In the method and the corresponding vehicle according to this invention one or more sensors can be applied.

In an embodiment the animal presence sensor for detecting the presence of an animal in a cubicle is included in the autonomous unmanned vehicle. Although sophisticated sensors can be applied, in practice also less accurate but robust sensors can be applied. The latter can be very advantageous in an agronomic environment like a dairy farm. It has merely to be determined whether a relatively large voluminous object, such as a cow, is present on a relatively small floor space of about 2 to 2.5 square meters. For example a quick scan, over for example the centerline of a cubicle or over the width near about the center of the cubicle, can suffice to determine whether a cubicle is occupied. This can be done, amongst others by means of laser sensors, ultrasound sensors, infrared thermometers, and 2D or 3D cameras.

In an alternative embodiment the animal presence sensor is located in or near each cubicle. This can be done by various methods known in the art, e.g. using a tag attached to an animal and which tag can be read by dedicated reading means and create a signal once an animal is within a certain range of e.g. the rear short end of a cubicle.

In both embodiments, viz. included in or remote from the vehicle, the sensor is able to generate signals based on the presence or absence of an animal. These signals are communicated with a computer system and converted into a position or location of an individual cubicle or neighboring next cubicles free from animals. After a position of the cubicle(s) has been determined, under control of the control system the autonomous unmanned vehicle is positioned with respect to the subject cubicle(s) and thereafter the cubicle floor cleaning means activated.

The computer system can be located in or near the barn, which in turn communicates with the control system of the autonomous unmanned vehicle, e.g. using communication means known in the art; the signals are monitored continuously or at regular intervals. Alternatively the computer system can be integrated in the control system of the autonomous unmanned vehicle.

In a preferred embodiment the cubicle floor cleaning means comprises a manure displacing device. The manure displacing device may comprise a telescopic carrier and/or a hingeable arm construction. In a further preferred embodiment the manure displacing device comprises a manure slide which is preferably made of rubber or synthetic material. To enhance the cleaning operation, preferably the manure displacing device comprises pressure setting means with the aid of which the force is set with which the manure displacing device is active on the cubicle floor. It is also possible to provide the manure displacing device with motor-drivable manure displacing members. The motor-drivable manure displacing members have the advantage that, during the cleaning operation, these do not require to be pressed on the cubicle floor with considerable force, like a manure slide.

In an embodiment the manure displacing device comprises one or more rotatable brushes.

In another embodiment the manure displacing device comprises a compressed air unit and/or a spraying unit by means of which the cubicle floor is cleaned with compressed air and/or liquid.

In another embodiment the manure displacing device comprises means applying a vacuum operation.

Also a combination of manure displacing means can be applied, for example a combination of rotatable brushes and compressed air, see for example US patent document U.S. Pat. No. 5,951,782 (Truitt) issued on Sep. 14, 1999.

In accordance with the method and corresponding autonomous unmanned vehicle of the invention the cubicle floor cleaning means, e.g. a manure slide, has an operational width of preferably more than the width of an individual cubicle, but preferably less than 85% of twice the cubicle width, preferably less than 80%, and more preferably less than 70% of twice the cubicle width. This would mean in practice for a dairy cattle stable having a typical cubicle width of about 1.1 m an operational width in a range of about 1.1 to about 1.85 meters, and more preferably of about 1.2 to about 1.5 meters, for example about 1.25 or about 1.4 meters. Such an operational width can be obtained using for example a single manure slide which is activated to clean overlapping floor areas, or a single wide manure slide, or using two or more slides working together and having an overlapping working range.

To further enhance the stable hygiene the cubicle floor cleaning means may further comprise disinfecting means such as a spraying unit. With the aid of the spraying unit it is possible to spray a cleaning and/or a disinfecting liquid over the already cleaned cubicle floor. A favorable location for such disinfecting means is on or near said cleaning means, such as a manure displacing device. The autonomous unmanned vehicle can be adjusted to carry one or more reservoirs comprising such cleaning and/or a disinfecting liquids. The autonomous unmanned vehicle can be equipped also with other payload.

In an embodiment the autonomous unmanned vehicle may further comprise means for detecting the presence of manure and/or dirt and which means can comprise of a camera, such as for example an infrared camera. It is further possible for the detection means to comprise a humidity meter with the aid of which the electric conductivity is determined on a cubicle floor. By means of a dielectric measurement it is possible to determine whether the cubicle floor is contaminated with manure. 3D cameras or image processing from 2D images can also be used. The means for detecting the presence of manure and/or dirt may generate a signal to the control system based upon which a decision can be made whether or not to clean the subject first and second cubicle floors in the defined area. In case no manure and/or dirt is being detected and in order to save cleaning time, the control system may decide to direct the autonomous unmanned vehicle to a next unoccupied cubicle for cleaning the cubicle floor.

In a further embodiment the autonomous unmanned vehicle may further comprise means for detecting the presence of manure and/or dirt and wherein said means are also capable of determining the location of the manure or dirt at the cubicle floor. Knowing the location of the manure or dirt on the cubicle floor, the control system can determine how far from the front end of the first and second cubicle the cubicle floor should be cleaned, for example only the first quarter of the cubicle length or up to the end of the cubicle and the cleaning means are activated accordingly. This will significantly enhance the time efficiency of the cleaning operation.

In an embodiment the autonomous unmanned vehicle further comprises a stable route planner. This allows the vehicle to continuously travel through a barn using a pre-set frequency and route such that over a period of time, for example one day, each cubicle and its neighboring cubicle are checked for the absence of animals and cleaned accordingly. This may ensure that each cubicle it fully cleaned at least once a day or at any desired higher frequency.

In an embodiment the autonomous unmanned vehicle further comprises means for determining the vehicle's position in a stable. Such navigation means allow amongst others to track the cleaning frequency of each individual cubicle throughout a day, to generate and feed data in order to calculate the optimum cleaning routes for a cleaning shift and to create cleaning priorities for each cubicle according to their cleaning frequencies.

In another aspect of the invention there is provided an autonomous unmanned vehicle that is adapted for use in a stable, preferably a stable for dairy cattle, and wherein the vehicle comprises a control system for controlling the operation of the vehicle, the control system is arranged to receive an input signal from an animal presence sensor related to the presence of an animal in a first of the cubicles and further related to the presence of an animal in a second of the cubicles neighboring next to the first cubicle, the control system is arranged to position the vehicle with respect to the first cubicle free from an animal, and cubicle floor cleaning means under control of the control system for cleaning a part of the cubicle floor, and the cubicle floor cleaning means are capable, during use, to clean at least a part of the first cubicle while keeping at least a predetermined safety distance ("d") to said second cubicle and wherein the predetermined safety distance "d" depends on whether an animal is detected to be present in said second neighboring cubicle.

In an embodiment of the autonomous unmanned vehicle the control system is arranged to position the vehicle with respect to two neighboring first and second cubicles free from animals and having a common lateral partition therebetween and each having a second lateral partition opposite to the lateral common partition, and cubicle floor cleaning means under control of the control system for cleaning a part of the cubicle floor over an operational width, and the cubicle floor cleaning means are capable, during use, to clean at least a part of the first and second cubicle in an area from the lateral common partition and extending at most until a predetermined safety distance from each of the lateral second partitions.

The autonomous unmanned vehicle is provided with a control system managing the operation of the vehicle.

For its locomotion the autonomous unmanned vehicle can include wheels driven by a motor. Preferably each of the wheels is individually driven by a motor. By driving the wheels at a different velocity, it is possible to steer the autonomous unmanned vehicle.

In an embodiment of the invention the operational width is preferably more than the width of an individual cubicle, but preferably less than 85% of the cubicle width, preferably less than 80%, and more preferably less than 70%, creating a practical operating range for the cleaning means while ensuring enhanced stable hygiene and animal safety.

In a preferred embodiment the operational width of the cubicle floor cleaning means in a range of about 1.1 to about 1.85 m, and preferably of about 1.2 to about 1.5 m, for example about 1.3 m.

The autonomous unmanned vehicle can include at least one animal presence sensor for detecting the presence of an animal, such as a cow, in a cubicle, and is preferably selected from the group comprising laser means, infrared means, radiographical means, and induction means. The sensor is able to generate signals based on the presence or absence of an animal. These signals are communicated with a computer system or directly with the control system and converted into a position of two neighboring unoccupied cubicles. After a position of the neighboring first and second cubicles has been determined, under control of the control system the autonomous unmanned vehicle is centered with respect to the subject cubicles and the cubicle floor cleaning means activated.

Alternatively, the autonomous unmanned vehicle is equipped to receive a signal from at least one animal presence sensor at a location remote from the vehicle itself. The received signal is communicated with the vehicle control system and in accordance with the invention under control of the control system the respective cleaning means are activated.

The autonomous unmanned vehicle can include a stable route planner. This allows the vehicle to travel through a stable at a pre-set frequency and route such that over a period of time, for example one day, each cubicle and its neighboring cubicle are checked for the absence of animals and cleaned accordingly. This may ensure that each cubicle it fully cleaned at least once a day or at any desired higher frequency.

The autonomous unmanned vehicle can include means for determining the vehicle's position in a stable.

The autonomous unmanned vehicle can include means for detecting the presence of manure and/or dirt and which means can comprise of a camera, such as for example an infrared camera. It is further possible for the detection means to comprise a humidity meter with the aid of which the electric conductivity is determined on a cubicle floor. By means of a dielectric measurement it is possible to determine whether the cubicle floor is contaminated with manure. The means for detecting the presence of manure and/or dirt may generate a signal to the control system based upon which a decision can be made to clean the subject cubicle floors. In case no manure and/or dirt is being detected and in order to save cleaning time, the control system may decide to direct the autonomous unmanned vehicle to next neighboring empty cubicles for cleaning the cubicle floors.

Some further embodiments and preferred embodiments of the autonomous unmanned vehicle are herein described when discussing the various embodiments of the method according to this invention.

The invention will now be illustrated with reference to non-limiting figures and embodiments according to the invention, and in which.

Figure 1:
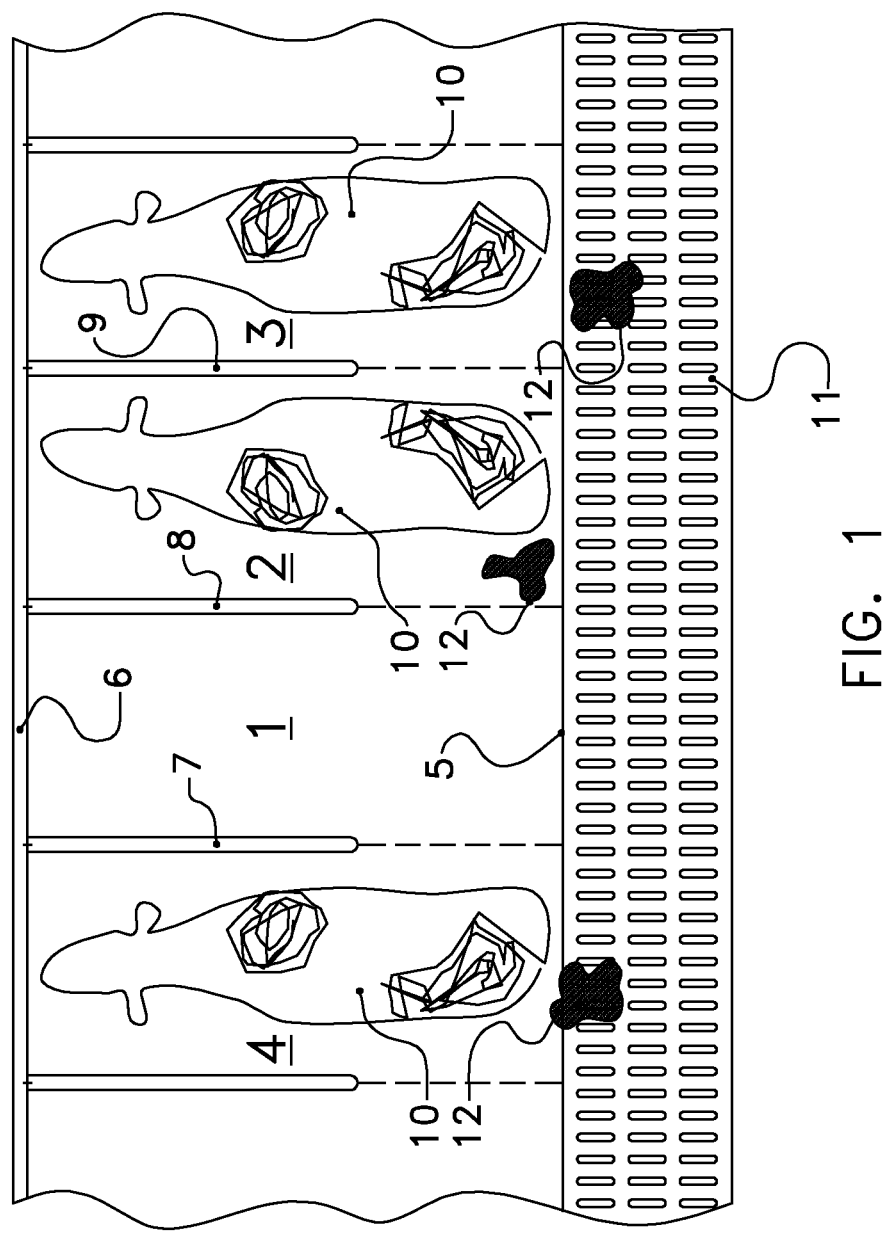
FIG. 1 shows a schematic top view of a row of cubicle for dairy cattle.

FIG. 1 shows in a top view a row of individual cubicles (1 to 4), wherein each cubicle has an open front end (5), a rear short end (6) and in the longitudinal direction partitions (7-9) between the cubicles. The positioning of an animal, for example a cow (10), is such that the animal is orientated substantially parallel to the longitudinal direction of the cubicle. There is provided a barn floor (11) in front of the row of cubicles, and in this non-limitative example the barn floor (11) is formed by a slatted floor. Cow manure (12) can be located onto the barn floor or onto the cubicle floor, both of which need to be cleaned on a frequent basis.

Figure 2:
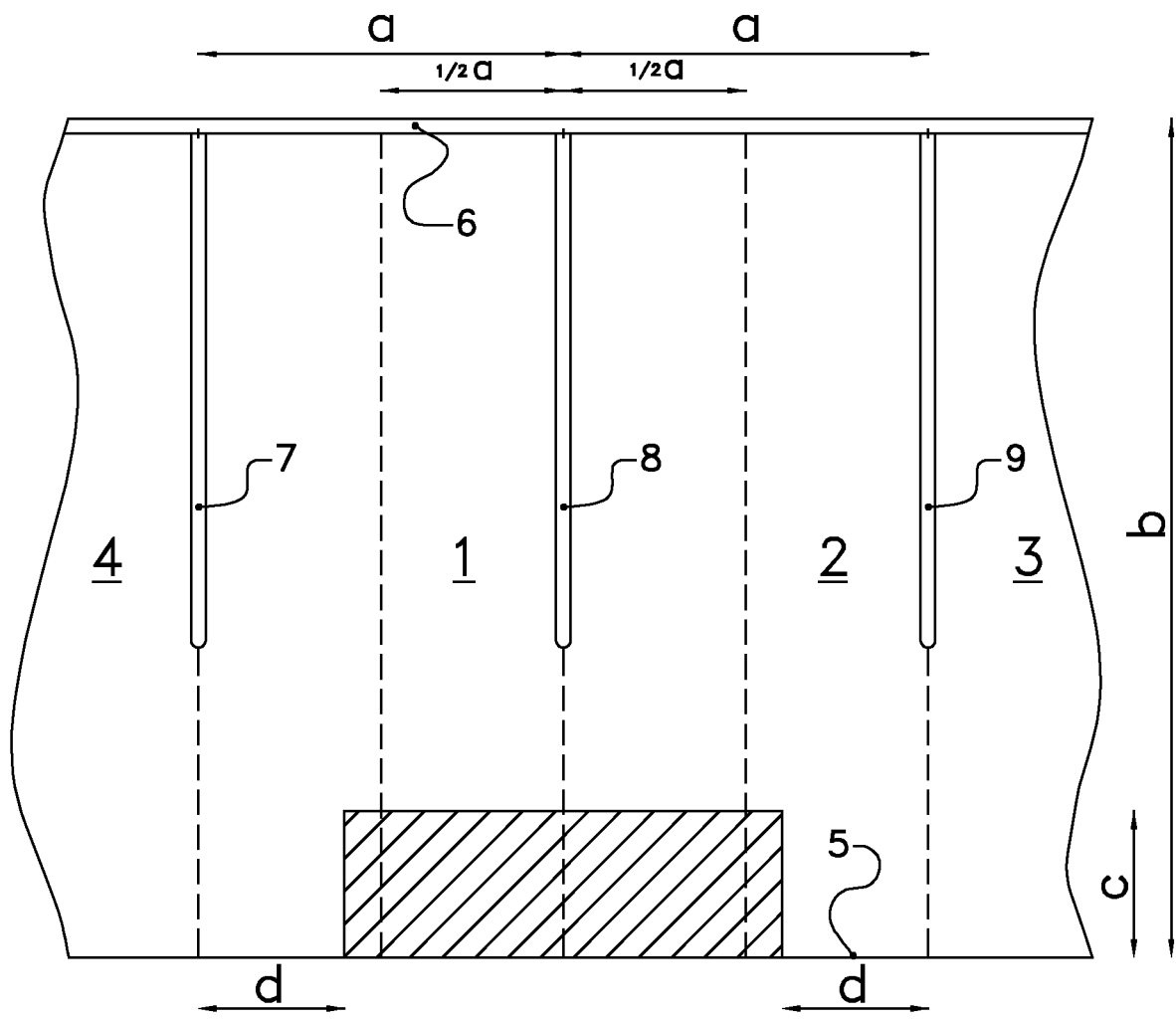
FIG. 2 shows a schematic top view of relevant dimensions of a cubicle.

FIG. 2 shows a top view of two empty neighboring cubicles (1,2). The two neighboring cubicles (1,2) share a common lateral partition (8) and each cubicle (1,2) has a second lateral partition (7,9) opposite to the common lateral partition (8). The width of each individual cubicle is of dimension "a" and the length of each individual cubicle is of dimension "b".

In accordance with the invention an empty cubicle is located and approached by an autonomous unmanned vehicle for cleaning using the activated cubicle floor cleaning means of said vehicle. If it is detected that the next neighboring cubicle is not occupied, then there is no danger for any undesired physical contact between the activated cubicle floor cleaning means and a body part that may extend underneath the second, opposite lateral partition (7,9) into the cubicle that is subject to a cleaning operation. In that case predetermined safety distance "d" can be selected to be very low, and can even be zero, such that the cubicle floor is being cleaned as good as possible. However, if it is detected that the next neighboring cubicle is occupied by an animal, then the cubicle has to be cleaned while keeping a safe distance from the common lateral partition to ensure that any undesired physical contact is avoided between the activated cubicle floor cleaning means and a body part of the animal in the neighboring cubicle. In practice for dairy cattle stables and corresponding cubicles it is preferred that a predetermined safety distance of at least about 0.3 m is being used.

In accordance with an embodiment of the invention the floor of two unoccupied neighboring cubicles cleaned using the activated cubicle floor cleaning means of the autonomous unmanned vehicle of this invention, and wherein the cleaned area is schematically shown by the oblique stroked area in FIG. 2. The cleaned area is centered preferably with respect to the common lateral partition (8) and extends in longitudinal direction from both cubicle's front end (5) over a distance having dimension "c". The cleaned cubicle floor area in its transverse direction extends from the centerline defined by the common lateral partition (8) up to the predetermined safety distance "d" from each of the lateral second partitions (7,9), and thereby defining also the operational width of the applied cleaning means. The cleaned cubicle floor area has such dimensions that it covers at least half of the width of each of both neighboring, unoccupied cubicles (1,2).

In a dairy cattle barn a typical cubicle width "a" is about 1.1 m and in accordance with the invention the cubicle floor cleaning means have an operational width in a range of about 1.1 to about 1.85 m, and more preferably of about 1.2 to about 1.5 m, for example about 1.3 m. Using the example of a cubicle width "a" of 1.1 m and an operational width of the cleaning means of about 1.3 m, when the cleaning means are centered with respect to the position of the common lateral partition (8) the activated cleaning means will clean an area extending about 0.65 m on both the left and right side of the common lateral partition. In this way the floor of each of the neighbouring, unoccupied cubicles is cleaned over more than 50% of its width while staying sufficiently far away, namely about 0.45 m, from the second lateral partition (7,9) opposite to the common lateral partition (8). By creating such a safety distance such as of about 0.3 m to about 0.4 m from the second, opposite lateral partition (7,9) it is ensured that any undesired physical contact is avoided between the activated cubicle floor cleaning means and a body part that may extend underneath the second lateral partition (7,9) into the unoccupied cubicle adjacent the second lateral partition that is subjected to a cleaning operation. It leaves the subject cubicle floors of the neighboring, unoccupied cubicles (1,2) cleaned over more than 50% of their respective widths. The remaining part of the floor of e.g. cubicle 2 of FIG. 2, can be cleaned in a subsequent cleaning operation such as in accordance with the present invention, once it has been detected that the cubicle 2 and its opposite counterpart e.g. cubicle 3 of FIG. 2 are both unoccupied and thus available for a cleaning operation as described above with respect to cubicles 1 and 2. Using the method and the corresponding autonomous unmanned vehicle according to this invention it can be ensured that on a statistical basis each individual cubicle is being cleaned at any pre-set frequency, e.g. three times a day.

To what extent the subject cubicle(s) are cleaned in their length ("c" dimension in FIG. 2) or longitudinal direction can be adjusted also in accordance with the invention. It can be up to a pre-set distance of for example 25% of the cubicle length, and with preferred wider ranges, or it can be over the whole length of the cubicle. Alternatively, it can be decided upon on a case-by-case basis based, for example based on a signal generated by means for detecting the presence of manure and/or dirt arranged to detect also the location of any such manure or dirt.

While various embodiments of the present invention have been described in detail, it is apparent that modifications and adaptations of those embodiments will occur to those skilled in the art. However, it is expressly understood that such modifications and adaptations are within the spirit and scope of the present invention.

The invention claimed is:

1. A method of cleaning at least a part of a floor of a cubicle from a row of individual cubicles in a stable, each cubicle having a floor space, an open front end for access of an animal to the cubicle and lateral partitions extending in the longitudinal direction on each side of the cubicle, the method comprising the steps of:
   providing an animal presence sensor arranged to detect the presence of an animal in an individual cubicle;
   providing an autonomous unmanned vehicle, the vehicle comprising a control system for controlling the operation of the vehicle and a cubicle floor cleaning mechanism configured to clean a part of the cubicle floor, the control system being operatively coupled with the animal presence sensor, wherein the floor cleaning mechanism includes a telescopic carrier or hingeable arm;
   detecting with the animal presence sensor a first of the individual cubicles free of an animal;
   detecting with the animal presence sensor whether an animal is present in a second of the individual cubicles neighboring next to the first individual cubicle free of an animal; and
   controlling the autonomous unmanned vehicle to clean at least a part of the floor of the first individual cubicle in a first cleaning mode that is dependent on the presence of an animal in said second neighboring individual cubicle,
   wherein during cleaning at least part of the floor of said first individual cubicle, the autonomous unmanned vehicle keeps at least a predetermined safety distance to said second neighboring cubicle,
   wherein if an animal is detected to be present in said second neighboring individual cubicle, the predetermined safety distance is between 15% and 50% of a width of an individual cubicle, and
   wherein if no animal is detected to be present in said second neighboring individual cubicle, the predetermined safety distance is in a range of 0 to 15% of a width of an individual cubicle.

2. The method according to claim 1, wherein the first individual cubicle is cleaned over a distance from the front end up to about 20% of a length of the cubicle.

3. The method according to claim 1, further comprising the steps of:
   detecting with the animal presence sensor at least two neighboring first and second individual cubicles free from animals and having a common lateral partition therebetween and each having a second lateral partition opposite to the common lateral partition;
   generating a signal with said animal presence sensor for the control system of the autonomous unmanned vehicle regarding a position of said first and second individual cubicles;
   under control of the control system, activating the cubicle floor cleaning mechanism; and
   cleaning in a second cleaning mode at least a part of both the first and second individual cubicle floors in an area from the common lateral partition and extending at most until a predetermined safety distance from each of the second lateral partitions,
   wherein the predetermined safety distance is selected as if an animal is present in individual cubicles of the row of individual cubicles that have said second lateral partition in common with the respective neighboring first and second individual cubicles.

4. The method according to claim 3, wherein the cubicle floor cleaning mechanism is centered with respect to the common lateral partition.

5. The method according to claim 1, wherein the control system of the autonomous unmanned vehicle is further provided with a stable route planner.

6. The method according to claim 1, further comprising the step of the control system of the autonomous unmanned vehicle determining a position of the autonomous unmanned vehicle in a stable.

7. The method according to claim 1, wherein the animal presence sensor is integrated in the autonomous unmanned vehicle.

8. The method according to claim 1, wherein if an animal is detected to be present in said second neighboring individual cubicle, the predetermined safety distance is at least 20% of a width of an individual cubicle.

9. The method according to claim 1, wherein if an animal is detected to be present in said second neighboring individual cubicle, the predetermined safety distance is at least 30% of a width of an individual cubicle.

10. The method according to claim 1, wherein if an animal is detected to be present in said second neighboring individual cubicle, the predetermined safety distance is at most about 45% of a width of an individual cubicle.

11. The method according to claim 1, wherein the first individual cubicle is cleaned over a distance from the front end up to about 25% of a length of the cubicle.

* * * * *